July 1, 1941.  A. S. T. LAGAARD  2,247,951
DOUGHNUT MACHINE
Filed Sept. 8, 1939  2 Sheets-Sheet 1
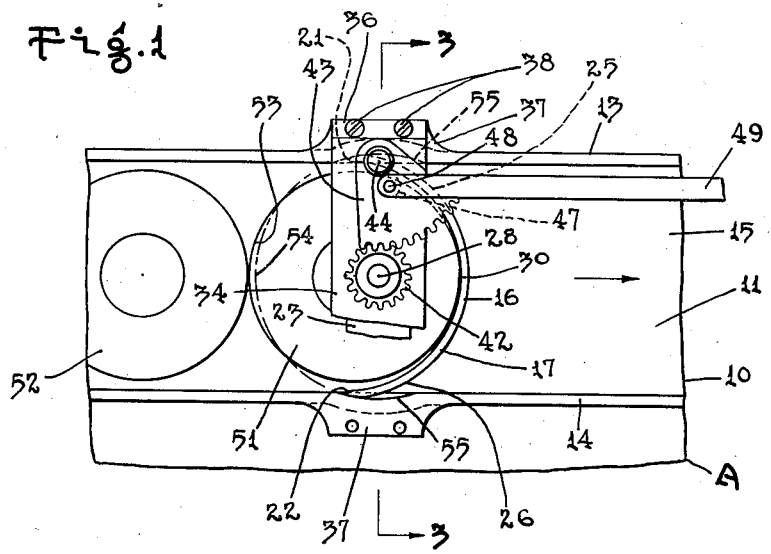
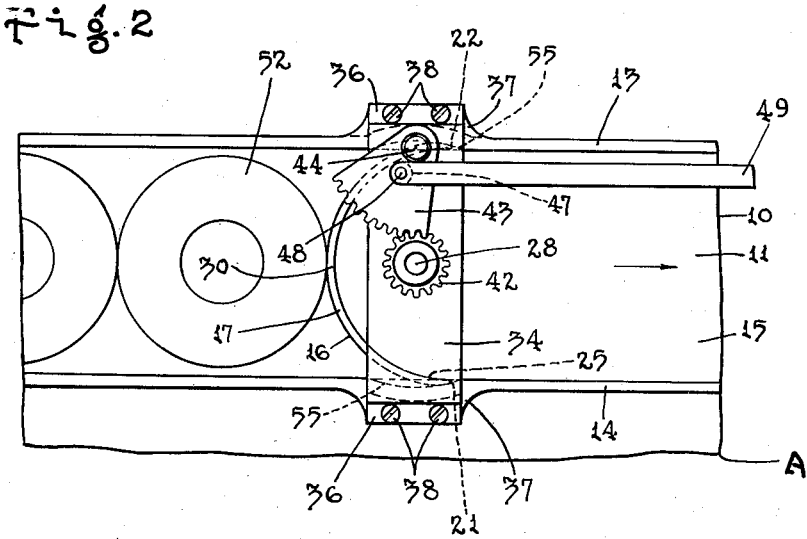
Inventor
Alexander S. T. Lagaard

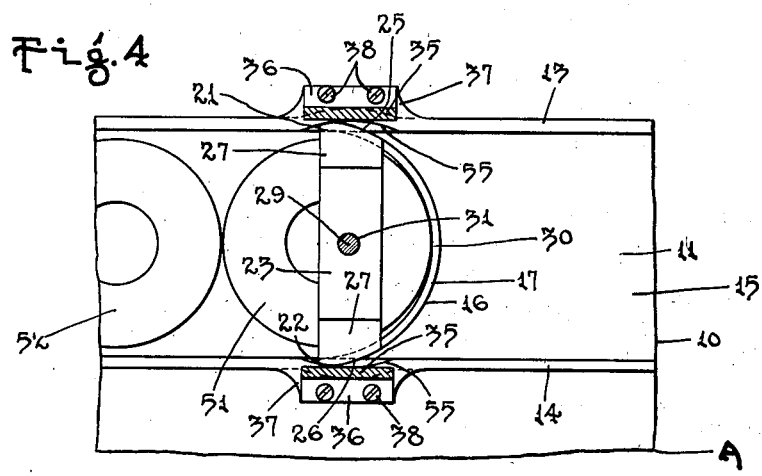
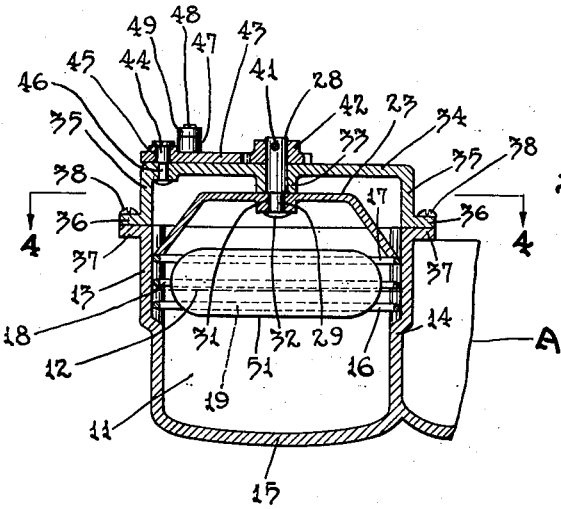

Patented July 1, 1941

2,247,951

UNITED STATES PATENT OFFICE 2,247,951

DOUGHNUT MACHINE

Alexander S. T. Lagaard, Minneapolis, Minn., assignor to Dough-King, Inc., Minneapolis, Minn., a corporation of Minnesota Application September 8, 1939, Serial No. 293,974

13 Claims. (Cl. 53—7)

My invention relates to doughnut machines and particularly to devices for controlling the travel of doughnuts to a doughnut turner or ejector of the continuous type such as disclosed in the application for patent of Peter J. Toews, Serial Number 114,395, filed Dec. 6, 1936.

An object of the invention resides in providing a device by means of which the travel of doughnuts is positively and effectively controlled.

Another object of the invention resides in providing a device which will not injure the doughnuts.

Another object of the invention resides in providing a control device having a single operable member movable from one to another of two different positions in the cooking liquid.

Another object of the invention resides in providing a control device in which all of the pivots and operating parts are disposed above the cooking liquid.

A feature of the invention resides in providing a control device in which the engaging member operates between the doughnuts so as to prevent injury thereto.

Another object of the invention resides in constructing the engaging member horseshoe shaped or in the shape of a semi-circle and of a diameter to receive the doughnut.

A feature of the invention resides in pivoting said engaging member about a vertical axis situated slightly eccentrically from the center of the engaging member.

An object of the invention resides in providing a control device which may be moved at any desirable rate of speed.

Other objects of the invention reside in the novel combination and arrangement of parts and in the details of construction hereinafter illustrated and/or described.

In the drawings:

Fig. 1 is a plan view of a portion of a doughnut machine illustrating an embodiment of my application.

Fig. 2 is a view similar to Fig. 1 showing the parts in altered position.

Fig. 3 is a cross sectional view taken on line 3—3 of Fig. 1.

Fig. 4 is a plan sectional view taken on line 4—4 of Fig. 3.

Fig. 5 is a perspective view of the engaging member removed from the doughnut machine.

In the application for patent of Peter J. Toews, above referred to, a doughnut machine is disclosed in which the doughnuts are deposited in a cooking liquid contained in a kettle or receptacle providing a way along which the doughnuts may travel and in which the doughnuts are progressed through propulsion of cooking liquid. In this way are disposed a turner and an ejector both of the continuous type which are adapted to turn and eject the doughnuts any time the doughnuts reach the same. With such devices it becomes necessary to provide some means for controlling the rate of travel of the doughnuts to the turner or ejector which, in the application for patent of Peter J. Toews, referred to, consisted of a pair of alternately movable gates. The present invention is of the nature of said gates and may be used in substitution thereof.

Inasmuch as the construction of doughnut machines with which my invention may be used is well known in the art, a complete doughnut machine has not been illustrated in this application and only so much of the doughnut machine as is necessary to describe the present invention has been shown.

In the drawings a portion of a doughnut machine A has been illustrated which consists of a kettle 10 having a way 11 in the same. This kettle contains the cooking liquid, the level of which is indicated by the reference number 12 in Fig. 3. The cooking liquid travels in the direction of the arrow shown in Fig. 1 and causes the progression of doughnuts along the way, the doughnuts floating upon the surface of the cooking liquid. The kettle 10 is constructed with side walls 13 and 14 and a bottom 15 connected therewith.

The invention proper comprises an engaging member 16, best shown in Fig. 5. This engaging member is constructed in the shape of a horseshoe or a semi-circle and consists of three metal rings 17, 18 and 19 of the same diameter, each substantially semi-circular in form and disposed one above the other. These rings may be constructed of wire or any other similar suitable material. The ends of these rings are connected together through tips 21 and 22, which may also be constructed of wire and which are welded or brazed to the said rings. By means of this construction the rings are held in spaced relation, as shown in Fig. 3, to permit the cooking liquid to pass freely therebetween. The engaging member 16 is further constructed with a transverse support 23 extending across the ends 25 and 26 of the said engaging member. This transverse support is provided with two legs 27 which are welded to the uppermost ring 17. The legs 27 extend downwardly so that the transverse support 23 is spaced somewhat above the uppermost ring 17, as shown in Fig. 3.

The transverse support 23 has attached to it a stub shaft 28 which is formed with a reduced portion 29 which passes through an opening 31 in the said transverse support. The end of the reduced portion 29 is riveted over as indicated at 32 to hold the shaft rigidly secured to the support 23.

The shaft 28 is journalled in a bearing 33 formed in a bridge 34 extending across the way 11. This bridge is carried by uprights 35 having flanges 36 extending outwardly from the lower ends thereof. These flanges overlie similar flanges 37 formed on the upper ends of the walls 13 and 14 of the kettle 10 and are secured thereto by means of screws 38.

The engaging member 16 is oscillated from its position shown in Fig. 1 to that shown in Fig. 2 by means of the following construction. Attached to the upper end of the shaft 28 by means of a pin 41 is a spur pinion 42. This spur pinion meshes with a spur gear segment 43, pivoted on a pin 44 secured to the bridge 34. The pin 44 extends through a hole 45 in the segment 43 and is constructed with a reduced portion 46, secured to the bridge 34 in the same manner as the reduced portion 29 of shaft 28 is secured to the transverse support 23. The segment 43 has a boss 47 formed therein which has issuing upwardly from it a pin 48. A link 49 is pivoted on this pin and extends longitudinally of the way 11. The link 49 is reciprocated by the transmission of the doughnut machine and is adapted to be moved at suitable intervals to procure operation of the control device.

To prevent the tips 21 and 22 from forming obstructions to the travel of the doughnuts along the walls 13 and 14 of the way 11, the said walls are recessed as indicated at 55 and the engaging member 16 formed of sufficient dimensions so that the tips 21 and 22 are received within said recesses. The distance between the inner surfaces of the tips 21 and 22 is preferably substantially equal to the width of the channel between the walls 13 and 14 so that the doughnuts travel along the said walls and are received within the engaging member 16 without lateral shifting.

The operation of the invention is as follows: In normal position the engaging member 16 occupies the position shown in Fig. 1 and a doughnut 51 is disposed adjacent the same. The preceding doughnut 52 abuts the doughnut 51 and is held in position thereby. While the shaft 28 is disposed midway between the two ends 25 and 26 of the engaging member 16, the said shaft is disposed considerably closer to the intermediate portion 30 of said engaging member than to the ends. This causes the doughnut 51 to be disposed so that the rearward portion 53 thereof is rearwardly of the arc, described by the tip 21 of the engaging member 16 and which is designated by the reference numeral 54. When the link 49 is moved toward the left, as viewed in Fig. 1, segment 43 is given a clockwise rotation which imparts to the pinion 42 a counterclockwise rotation. This causes the tip 21 to move along the line 54 into a position in advance of the doughnut 52. Movement of the said tip in this direction forceably engages the doughnut 51 and advances the same, the said tip reaching a position in advance of the doughnut 52. Movement of the engaging member 16 then continues until the doughnut 52, as shown in Fig. 2, engages the rear surface of the intermediate portion 30 of engaging member 16. Doughnut 51 is then free to flow away from the control device and travels along its course in the way 11. After doughnut 51 has left the engaging member 16 the said member is again moved back to normal position, as shown in Fig. 1 and the doughnut 52 is received within the said engaging member, engaging the inner surface of the intermediate portion 30 thereof. Doughnut 52 then occupies the position of doughnut 51 in Fig. 1. It will thus be seen that one doughnut at a time may be allowed to pass by the control device and to be fed to the turner or ejector of the doughnut machine. By timing the movement of the link 49 the number of doughnuts released to the turner and ejector and consequently the capacity of the machine may be accurately controlled.

The advantages of my invention are manifest. An extremely simple and practical construction is provided whereby the travel of doughnuts along the way of the doughnut machine may be positively and accurately determined. The control device is simple in construction and all of the operating parts therefor are disposed outwardly of the cooking liquid. The entire control device may be removed without disturbing the cooking liquid. My invention operates to control the travel of doughnuts without injury thereto. My invention may be used with existing doughnut machines without appreciable reconstruction thereof.

Changes in the specific form of my invention, as herein disclosed, may be made within the scope of what is claimed without departing from the spirit of my invention.

Having described my invention, what I claim as new and desire to protect by Letters Patent is:

1. In a doughnut machine in which the doughnuts are progressed along a way through the flow of the cooking liquid, an engaging member, means forming a pivot for said engaging member and having a vertical axis, said engaging member being adapted to be moved from one position in the way to another position in the way upon swinging about said pivot, and means for periodically swinging said engaging member.

2. In a doughnut machine in which the doughnuts are progressed along a way through the flow of the cooking liquid, an engaging member substantially semi-circular in form and disposed in said way, and pivot means for said engaging member extending in a vertical direction and in the same direction as the axis of said engaging member, and means for moving said engaging member from one position to another to release the doughnuts one at a time for travel along said way.

3. In a doughnut machine in which the doughnuts are progressed along a way through the flow of the cooking liquid, an engaging member substantially semi-circular in form and disposed in said way with the axis thereof extending vertically and in the center of said way, pivot means having a vertical axis for supporting said engaging member, said pivot means being disposed in the center of said way and means for swinging said engaging member about said pivot means for movement from one position to another to release the doughnuts one at a time for travel along said way.

4. In a doughnut machine having a kettle formed with a way in which the doughnuts are progressed through the flow of the cooking liquid, an engaging member substantially semi-circular in form and disposed in said way, a support attached to said kettle and extending toward the center of said way, pivot means associated with said support for mounting said engaging member for swinging movement within said way, said engaging member being movable from one position to another position in said way to release the doughnuts one at a time for travel along said way.

5. In a doughnut machine having a kettle formed with a way in which the doughnuts are progressed through the flow of the cooking liquid, an engaging member substantially semi-circular in form and disposed in said way, a bridge extending across said way and attached to said kettle, pivot means between said bridge and support for supporting said engaging member for movement from one position in the way to another position to release the doughnuts one at a time for travel along said way.

6. In a doughnut machine having a kettle formed with a way in which the doughnuts are progressed through the flow of the cooking liquid, an engaging member substantially semi-circular in form and disposed in said way, a bridge extending across said way and attached to said kettle, pivot means between said bridge and support for supporting said engaging member for movement from one position in the way to another position to release the doughnuts one at a time for travel along said way, the axis of said pivot means being disposed vertically.

7. In a doughnut machine having a kettle formed with a way in which the doughnuts are progressed through the flow of the cooking liquid, an engaging member substantially semi-circular in form and disposed in said way, a support attached to said kettle and extending toward the center of said way, a bearing carried by said support and disposed above said way, a shaft secured to said engaging member and journalled for rotation in said bearing, said shaft having a vertical axis and means attached to said shaft for swinging said engaging member from one position to another in the way to release the doughnuts one at a time for travel along said way.

8. In a doughnut machine having a kettle formed with a way in which the doughnuts are progressed through the flow of the cooking liquid, an engaging member substantially semi-circular in form and disposed in said way, a support attached to said kettle and extending toward the center of said way, a bearing carried by said support and disposed above said way, a shaft secured to said engaging member and journalled for rotation in said bearing, said shaft having a vertical axis, a gear attached to said shaft, a pivoted member having gear teeth adapted to mesh with said gear and a link pivoted to said pivoted member and adapted to oscillate the same.

9. In a doughnut machine having a kettle formed with a way in which the doughnuts are progressed through the flow of the cooking liquid, an engaging member substantially semi-circular in form and disposed in said way, a support attached to said kettle and extending toward the center of said way, a bridge extending across said way and carried by said kettle, a bearing formed in said bridge and having a vertical axis, said shaft journalled in said bearing and supporting said engaging member for oscillatory movement, said engaging member being disposed beneath said bearing, a gear secured to said shaft above said bearing, a member pivoted to said support and having gear teeth meshing with said pinion, and a link connected to said pivoted member for oscillating the same.

10. In a doughnut machine in which the doughnuts are progressed along a way through the flow of the cooking liquid, an engaging member substantially semi-circular in form and disposed in said way, pivot means for said engaging member extending in a vertical direction and in the same direction as the axis of said engaging member, said pivot means being eccentrically disposed relative to the axis of said engaging member, and means for moving said engaging member from one position to another to release the doughnuts one at a time for travel along said way.

11. In a doughnut machine in which the doughnuts are progressed along a way through the flow of the cooking liquid, an engaging member circular in form, said engaging member being of circumferential extent less than a semi-circle, and pivot means for said engaging member extending in a vertical direction and in the same direction as the axis of said engaging member, and means for moving said engaging member from one position to another to release the doughnuts one at a time for travel along said way.

12. In a doughnut machine in which the doughnuts are progressed along a way through the flow of the cooking liquid, an engaging member arcuate in form of an extent less than a complete circle and disposed in said way, pivot means for said engaging member, and means for moving said engaging member about said pivot from one position to another in said way to release the doughnuts one at a time for travel along said way.

13. In a doughnut machine in which the doughnuts are progressed along a way through the flow of the cooking liquid, an engaging member having a convex and a concave surface, means forming a pivot for said engaging member, said engaging member being adapted to be moved to a position in which the doughnuts engage the convex side of the engaging member to obstruct movement thereof to a position in which the doughnuts are moved to the concave side of the engaging member whereby the doughnuts become released, and means for periodically turning said engaging member.

ALEXANDER S. T. LAGAARD.